(12) United States Patent
Williamson et al.

(10) Patent No.: US 10,422,584 B2
(45) Date of Patent: Sep. 24, 2019

(54) APPARATUS TO CONTROL THE TOTAL ENERGY FLUX INTO THE TOP INGOT SURFACE DURING VACUUM ARC REMELTING PROCESSES

(71) Applicants: Rodney L. Williamson, Albuquerque, NM (US); David K. Melgaard, Albuquerque, NM (US); Joseph J. Beaman, Austin, TX (US)

(72) Inventors: Rodney L. Williamson, Albuquerque, NM (US); David K. Melgaard, Albuquerque, NM (US); Joseph J. Beaman, Austin, TX (US)

(73) Assignee: Specialty Metals Processing Consortium, Albuquerque, NM (US)

( * ) Notice: Subject to any disclaimer, the term of this patent is extended or adjusted under 35 U.S.C. 154(b) by 655 days.

(21) Appl. No.: 14/666,378

(22) Filed: Mar. 24, 2015

(65) Prior Publication Data
US 2015/0308747 A1    Oct. 29, 2015

Related U.S. Application Data

(60) Continuation-in-part of application No. 13/374,170, filed on Dec. 13, 2011, now abandoned, which is a division of application No. 11/501,198, filed on Aug. 8, 2006, now Pat. No. 8,077,754.

(51) Int. Cl.
| | | |
|---|---|---|
| H05B 7/144 | (2006.01) |
| H05B 3/60 | (2006.01) |
| F27D 19/00 | (2006.01) |
| H05B 7/152 | (2006.01) |
| F27B 3/08 | (2006.01) |
| F27D 21/00 | (2006.01) |
| F27D 11/08 | (2006.01) |
| F27D 7/06 | (2006.01) |
| F27D 99/00 | (2010.01) |

(52) U.S. Cl.
CPC .............. *F27D 19/00* (2013.01); *F27B 3/085* (2013.01); *F27D 11/08* (2013.01); *F27D 21/00* (2013.01); *H05B 7/144* (2013.01); *H05B 7/152* (2013.01); *F27D 2007/066* (2013.01); *F27D 2019/0028* (2013.01); *F27D 2019/0037* (2013.01); *F27D 2019/0096* (2013.01); *F27D 2099/0021* (2013.01); *Y02P 10/256* (2015.11); *Y02P 10/259* (2015.11)

(58) Field of Classification Search
CPC .......... F27B 3/085; F27B 11/08; F27B 19/00; F27B 21/00; F27B 2007/066; F27B 2019/0028; F27B 2019/0037; F27B 2019/0096; F27B 2099/0021; H05B 7/144; H05B 7/152; Y02P 10/256; Y02P 10/259
USPC ......... 373/47, 49, 50, 67, 70, 102, 104, 105, 373/106
See application file for complete search history.

*Primary Examiner* — Hung D Nguyen
(74) *Attorney, Agent, or Firm* — Aleónlaw, P.C.; Alberto A. León, Esq.

(57) ABSTRACT

A Vacuum Arc Remelting controller apparatus wherein process control is accomplished primarily through control of pool power. Pool power being defined as the total energy flux into a top ingot surface of the VAR ingot. The controller apparatus of the present invention comprises a controller computer that transmits commands to the host furnace through an ethernet connection.

5 Claims, 10 Drawing Sheets

APPARATUS TO CONTROL THE TOTAL ENERGY FLUX INTO THE TOP INGOT SURFACE DURING VACUUM ARC REMELTING PROCESSES

CROSS-REFERENCE TO RELATED APPLICATIONS

This application is Continuation-in-Part of a divisional patent application from U.S. patent application Ser. No. 11/501,198 filed Aug. 8, 2006 titled "Pool Power Control in Remelting Systems" by the same inventors and claim of priority therefrom (the "Parent Application"). The predecessor divisional application was filed in response to a restriction requirement contained in an office action dated Apr. 13, 2009, and contained the apparatus disclosed and claimed in the Parent Application, as officially filed, but not elected in applicant's response to the restriction requirement. The Divisional Application and the Parent Application are fully incorporated herein by means of this reference.

STATEMENT REGARDING FEDERALLY SPONSORED RESEARCH AND DEVELOPMENT

The United States Government has rights to this invention pursuant to Contract No. DE-AC04-94AL85000 awarded by the U.S. Department of Energy.

THE NAMES OF THE PARTIES TO A JOINT RESEARCH AGREEMENT

Non-applicable

INCORPORATION-BY-REFERENCE OF MATERIAL SUBMITTED ON A COMPACT DISC

Non-applicable

BACKGROUND OF THE INVENTION

Field of the Invention

The invention relates generally to apparatuses for controlling remelting processes, namely vacuum arc remelting (VAR). More specifically, the invention relates to an apparatus to control the total energy flux into the top ingot surface during VAR.

Description of the Related Art Including Information Disclosed Under 37 CFR 1.97 and 17 CFR 1.98

In the VAR process, a cylindrically shaped, alloy electrode is loaded into a water-cooled, copper crucible of a VAR furnace, the furnace is evacuated, and a direct current (dc) arc is struck between the electrode (cathode) and some start material (e.g., metal chips) at the bottom of the crucible (anode). The arc heats both the start material and the electrode tip, eventually melting both. As the electrode tip is melted away, molten metal drips off and an ingot forms in the copper crucible. Because the crucible diameter is larger than the electrode diameter, the electrode must be driven downward toward the anode pool to keep the mean distance between the electrode tip and pool surface constant. The speed at which the electrode is driven down is called the electrode feed rate or drive speed. The mean distance between the electrode tip and the ingot pool surface is called the electrode gap.

Besides radiation, the ingot pool surface receives power or energy flux from two sources: (1) the electrical arc and (2) heat or enthalpy contained in molten metal dripping into the pool from the melting electrode. The first energy flux source is called arc power, the second energy flux source is called melt power. The fraction of total power consumed by melting is given by $\mu$.

Under the assumption of steady-state thermal conditions in the electrode, conduction losses along the electrode may be neglected because the electrode burn-off rate matches the rate at which the thermal boundary layer front propagates up the electrode. Thus, melt power is equal to the total power absorbed from the arc plasma by the electrode tip due to electron and ion impacts, which then enters the ingot pool as heat contained in the dripping metal. The pool also receives power from the arc plasma due to electron and ion impacts. Thus, under nominal, steady-state conditions, total power to the ingot pool surface is approximated by adding both arc power and melt power together. This sum is called the pool power, $P_{pool}$, and is defined by $$P_{pool} \approx \dot{M} h_{M,sup} + f(1-\mu)IV$$

where f in this equation is the fraction of the arc plasma power collected by the ingot surface, I is current, V is voltage, $\dot{M}$ is electrode melt rate (the rate at which the electrode is being consumed) and $h_{M,sup}$ is the mass specific enthalpy at superheat temperature contained in the metal dripping from the electrode tip. Under nominal processing conditions for Alloy 718, ~85% of the total power available is collected by the pool as arc power and melt power, the rest being collected as arc power by the bare crucible wall above the top ingot surface.

The present invention provides an apparatus to control a VAR process by controlling $P_{pool}$, or the total energy flux into the top ingot surface as defined above. The term "pool power" will be used interchangeably with "total energy flux to the top surface of the ingot." Current state-of-the-art VAR controllers seek to control electrode gap and melt rate, the rate at which the electrode is consumed. However, melt rate control during transient melting conditions allows for large excursions in arc power and, therefore, energy delivered to the ingot pool surface. This, in turn, causes variations in the solidification rate of the ingot which may lead to the formation of solidification defects in the ingot. Thus, pool power represents a significant improvement over melt rate control because it controls the total energy flux from both the arc and molten metal dripping from the electrode into the top surface of the ingot. By contrast, melt rate control controls only the energy flux due to the dripping molten metal.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
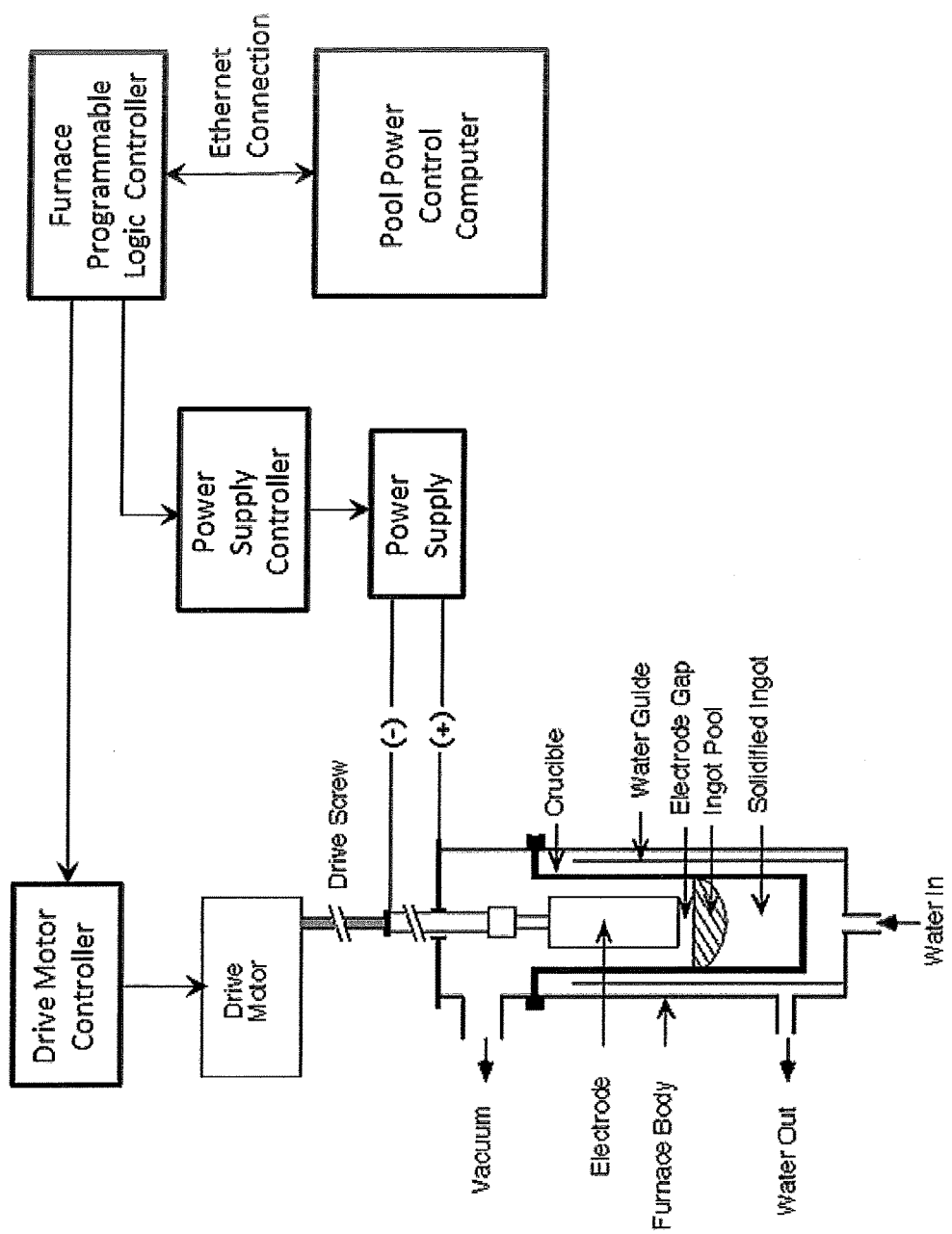
FIG. 1 is a schematic drawing of the pool power controller assembly, which comprises a pool power controller computer that communicates to the host remelting furnace's programmable logic controller (PLC) over an Ethernet, or other communications protocol, connection. In this instance, the remelting furnace depicted is a vacuum arc remelting furnace. The pool power controller computer sends new current and electrode drive speed commands to the PLC which relays them to the furnace power supply controller and electrode drive speed controller, respectively.

The present invention comprises a VAR controller apparatus wherein process control is accomplished primarily through control of pool power; pool power being defined as the total energy flux into the top surface of the VAR ingot.

A common form of modern VAR process control seeks to control arc power and electrode gap. Typically, arc power is controlled by controlling the process current to a reference setpoint using a proportional-integral (PI) or proportional-integral-derivative (PID) control feedback loop. Electrode gap is usually controlled open loop by controlling the process either to a reference voltage or a reference drip-short frequency. Either method is based on the assumption that the electrode gap will be controlled to a constant value if the process is forced to faithfully track the voltage or drip-short frequency reference. Other important open loop variables are electrode melting rate, electrode tip shape, crown and shelf formation at the top of the ingot, total energy input to the ingot top surface (pool power), the ingot-crucible contact boundary, ingot surface morphology, and ingot pool shape (i.e., liquidus and solidus isotherms positions). Some of these variables are, of course, related. There are two commanded inputs to the system for VAR of nickel-base alloys: current ($I_c$) and electrode ram velocity ($U_{ram,c}$) or position ($X_{ram,c}$). There are two additional command inputs for titanium alloy melting: stirring coil current and reversal time.

A different means of control involves controlling electrode gap and electrode melting rate, the rate at which the electrode is consumed, instead of electrode gap and arc power. In that system, process current replaces electrode melting rate in the list of open loop variables. In other words, the current is made to be whatever it needs to be in order to meet the electrode melting rate reference setpoint. A major difficulty with this method has to do with the fact that the relationship between electrode melting rate and arc power is both nonlinear and history dependent. This difficulty was addressed through the development of a nine-state advanced VAR (AVARC-I) control technology, as disclosed in U.S. Pat. No. 6,115,404 and in Williamson et al, "Model-Based Melt Rate Control during Vacuum Arc Remelting of Alloy 718," Metallurgical and Materials Transactions B, Volume 35B, February 2004, pp. 101-113. Again, this technology controls electrode gap and the rate at which the electrode is consumed, allowing the arc power to vary as required to maintain the melt rate at its setpoint reference value. In other words, melt rate control regulates melt power. Melt rate control does not regulate the total energy flux to the top ingot surface, or pool power, is not regulated.

The pool power controller of the present invention preferably employs the following assumptions: 1) a uniform, diffuse arc exists throughout the inter-electrode region; 2) contributions to pool power due to radiation are negligible; 3) steady-state melt power all returns to the pool as enthalpy, or heat, contained in the molten metal dripping from the electrode; and 4) arc power is distributed between the ingot pool and crucible wall above the pool according to simple geometry. Given these assumptions, the following equation may be derived describing the pool power:

$$P_{pool} = \frac{\dot{M} h_{sup}}{\rho} + \varepsilon[V_{CF} I + (R_I + R_G G) I^2] \qquad (1)$$

where $$\dot{M} = -\frac{\rho A_e \alpha_r C_{S\Delta}}{\Delta} + \frac{\rho C_{Sp} \mu [V_{CF} I + (R_I + R_G G) I^2]}{h_m}. \qquad (2)$$

In these equations, $\dot{M}$ is melt rate, $\rho$ is density at superheat temperature, $h_{sup}$ is volume specific enthalpy at superheat temperature, $\varepsilon$ is arc power fraction to the pool surface, $V_{CF}$ is the cathode fall voltage, $I$ is the process current, $R_I$ is the VAR circuit resistance less the electrode gap resistance, $R_G$ is the experimentally determined electrode gap resistance parameter, $G$ is electrode gap, $A_e$ is electrode cross-sectional area, $a_r$ is room temperature thermal diffusivity, $C_{S\Delta}$ and $C_{Sp}$ are material dependent constants, $\mu$ is process efficiency, $\Delta$ is electrode thermal boundary layer, and $h_m$ is volume specific enthalpy at melt temperature. Note that the quantity enclosed in square brackets in these expressions defines the VAR process electrical power function. This quantity multiplied by e gives the fraction of the total power collected by the ingot pool surface from the arc plasma. Thus, Equation (1) states that the pool power, or total energy flux to the top of the ingot, is equal to the total enthalpy input due to the melting electrode plus the total arc power collected by the ingot pool surface. Note that common melt rate control regulates only the first term to the right of the equals sign in Equation (1). Melt rate control does not regulate the second term to the right of the equals sign in Equation (1) and varies as the arc power is varied to maintain the melt rate setpoint reference value. Thus, in melt rate control, the pool power, or total energy flux to the top ingot surface, continually varies as arc power is regulated to achieve the desired rate of electrode consumption.

If Equation (2) is substituted into Equation (1) and the result is solved for current, the pool power control equation of the invention is obtained:

$$I = \frac{-V_{CF}}{2(R_I + R_G G)} + \sqrt{\left(\frac{V_{CF}}{2(R_I + R_G G)}\right)^2 + \frac{P_{pool} + \frac{\alpha_r C_{S\Delta} A_e h_{sup}}{\Delta}}{\left(\frac{\mu C_{Sp} h_{sup}}{h_m} + \varepsilon\right)(R_I + R_G G)}} \quad (3)$$

Equation (3) is preferred in order to find the current required to give pool power $P_{pool}$.

Figure 2:
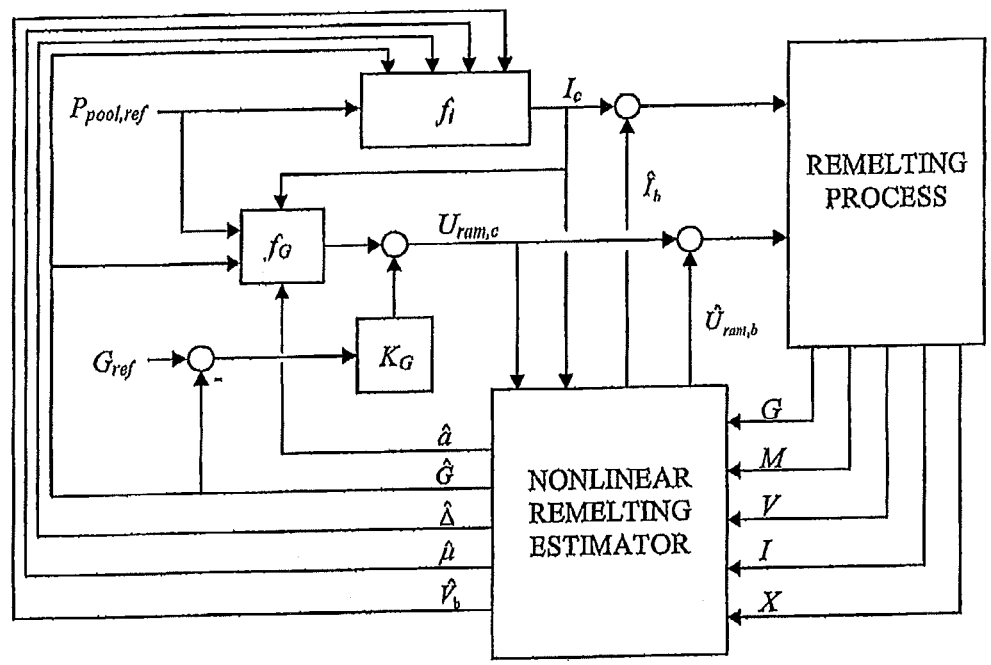
FIG. 2 is a schematic diagram of the preferred pool power controller of the invention, with reference inputs $G_{ref}$ and $P_{pool,ref}$ and process input commands $I_c$ and $U_{ram,c}$ (commanded electrode velocity) or $X_{ram,c}$ (commanded electrode position)—the VAR non-linear remelting estimator for this controller contains a model of the VAR melting dynamics and provides the estimated outputs shown given the measured furnace variables and process inputs.

A nonlinear controller is then used that employs Equation (3). Industrial VAR furnaces are usually controlled using a programmable logic controller, or PLC. In an embodiment of the apparatus of this invention, Equation (3) is programmed into a controller computer, as depicted in FIG. 1. The controller computer communicates with the host furnace PLC over an ethernet connection or some other communications protocol. It sends the PLC current commands generated using Equation (3). The PLC is re-programmed to accept these new current commands and substitute them in place of the current commands it normally generates for either arc power or electrode melt rate control, depending on the mode of control normally used for that particular furnace in question. The PLC then sends the current commands to the furnace power supply controller as it normally does, and the power supply controller regulates the power supply to generate the commanded current for pool power control. A schematic diagram of the controller is shown in FIG. 2. The VAR non-linear remelting estimator for this controller is preferably identical to that of AVARC-I as disclosed by Bertram et al. and so the Kalman gains are the same. This is required because, as shown by Equation (1), it is necessary to estimate the electrode melting rate in order to estimate the total energy flux into the top surface of the ingot. Note that a different electrode melting estimator than that disclosed by Bertram et al. could be used, as long as the output from the estimator gives an accurate estimate of the rate at which the electrode is being consumed.

The preferred embodiment of the controller apparatus disclosed and claimed herein also comprises an electrode gap controller, and so it is also necessary that the electrode estimator be able to generate an accurate estimate of electrode gap or that some other means of estimating electrode gap be used. In the preferred embodiment of the apparatus, the controller computer of FIG. 1 supplies an electrode drive speed command over the communications interface to the host VAR furnace PLC which has been re-programmed to substitute the new value of the drive speed command sent from the pool power controller computer for the one that is normally used. The PLC then supplies this new drive speed command to the furnace electrode drive speed controller that it normally uses, and the controller regulates the electrode drive speed motor to get the desired drive speed. Note that it is not necessary that the the pool power controller be used to also control the electrode gap, but it is the preferred embodiment of the invention. However, it is necessary that accurate estimates of electrode gap be available for the controller, as shown in Equation (3), electrode gap, G, is a necessary variable in computing the total energy flux into the top surface of the ingot.

The function boxes (controllers, which can be software or hardware components of a monolithic controller or implemented separately in hardware/software) in FIG. 2 have the following preferred definitions, in which a variable in angular brackets indicates a variable that is fed into the function box and a hat over a variable indicates an estimated quantity:

$$f_I = \frac{-(V_{CF} + \langle \hat{V}_b \rangle)}{2(R_I + R_G \langle \hat{G} \rangle)} + \quad (4)$$

$$\sqrt{\left(\frac{(V_{CF} + \langle \hat{V}_b \rangle)}{2(R_I + R_G \langle \hat{G} \rangle)}\right)^2 + \frac{\langle P_{pool,ref} \rangle + \frac{\alpha_r C_{S\Delta} A_e h_{sup}}{\langle \hat{\Delta} \rangle}}{\left(\frac{\langle \hat{\mu} \rangle C_{Sp} h_{sup}}{h_m} + \varepsilon\right)(R_I + R_G \langle \hat{G} \rangle)}}$$

$$f_G = \frac{\langle \hat{a} \rangle}{h_{sup} A_e} \{\langle P_{pool,ref} \rangle - \varepsilon[(V_{CF} + \langle \hat{V}_b \rangle)\langle I_c \rangle + (R_I + R_G \langle \hat{G} \rangle)\langle I_c \rangle^2]\} \quad (5)$$

$\hat{V}_b$ in these equations is the estimated voltage bias. Likewise, $\hat{I}_b$ and $\hat{U}_{ram,b}$ in FIG. 2 are estimated current bias and ram velocity bias, respectively. In the preferred embodiment of the invention, Equations (3) through (5) are all programmed into the controller software residing on the controller computer shown in FIG. 1, and the controller computer sends both process current and electrode drive speed commands over the ethernet interface to the furnace PLC as they are generated from these equations according to FIG. 2.

INDUSTRIAL APPLICABILITY

The invention described and claimed herein is further illustrated by the following non-limiting example, which shows the efficacy of the method and apparatus of the invention in controlling the VAR process to create high quality metal ingots.

Example 1

The pool power controller apparatus of the present invention was assembled and tested on an existing VAR furnace. A standard Windows-based computer was used to communicate with the host furnace PLC, the controller software having been written in the C programming language. Three tests were performed, all melting 0.15 m (6 inch) diameter 304SS electrode into 0.22 m (8.5 inch) diameter ingot. Test 1 was used to work out hardware and software issues and will not be discussed. Test 2 (heat 03V-53) used a full 9-state controller to perform a factor space experiment to confirm control under different melting conditions. Test 3 (heat 03V-54) involved using the controller to melt through welds. For these tests, the arc power fraction was estimated to be 0.3.

Figure 3:
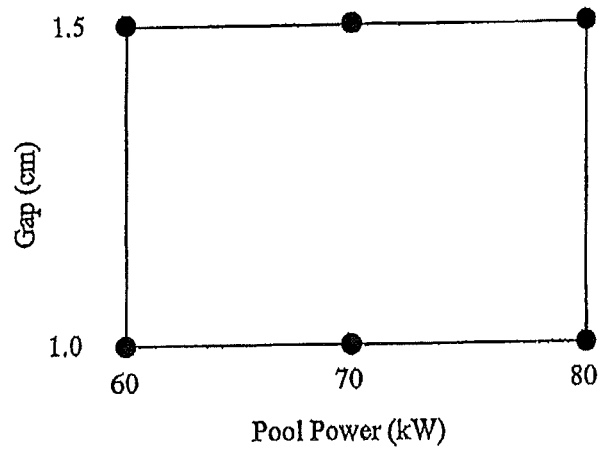
FIG. 3 is a diagram of the target factor space used for Test 2 of the example.
Figure 4:
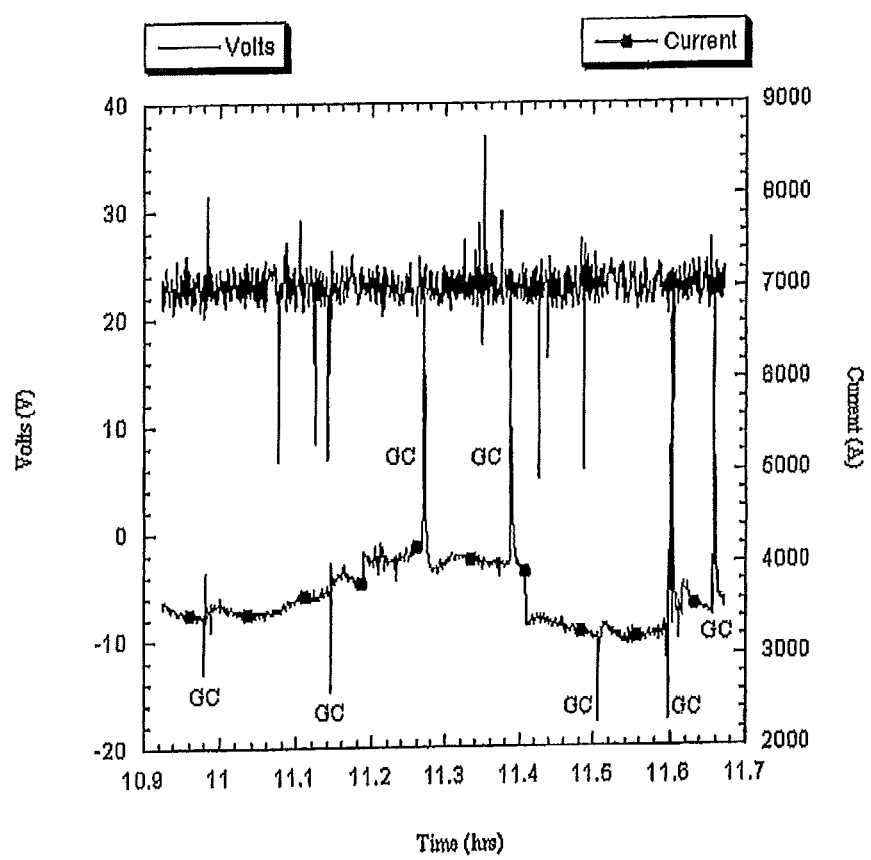
FIG. 4 is a graph of voltage and current traces for the factor space experiment of the example—the letters GC mark gap checks.
Figure 5:
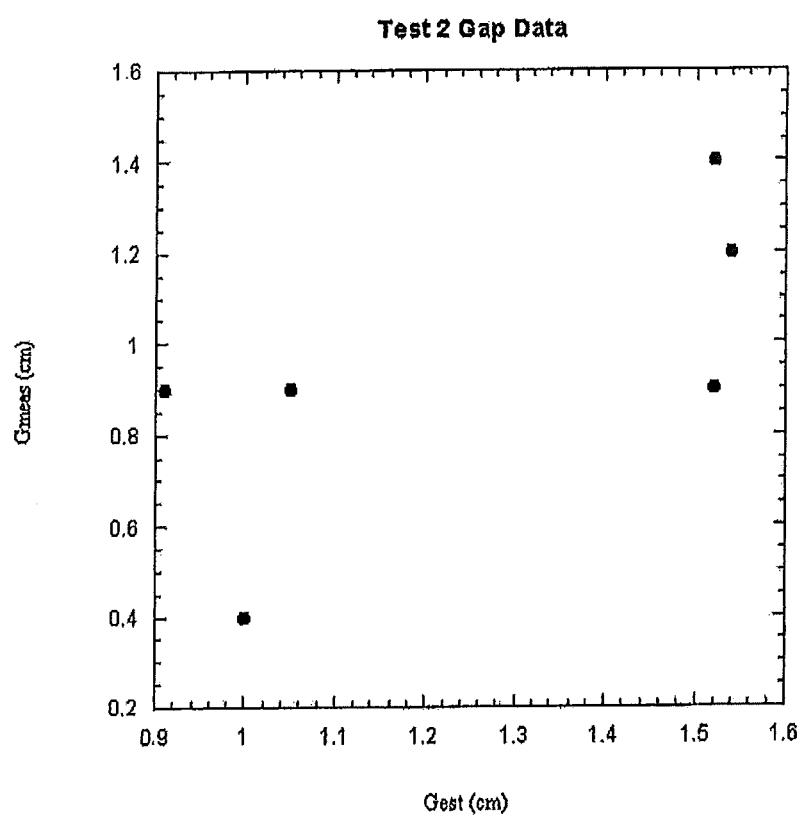
FIG. 5 is a plot of the gap check data against the estimated gap from the controller.

Test 2:

A 158 kg electrode was melted at several different electrode gap and pool power settings. The various target conditions are shown in FIG. 3. FIG. 4 shows the voltage and current traces associated with this test. Seven gap checks were performed by driving the electrode down until a dead short occurred. Gap check 5 did not yield good data and the other measurements were somewhat noisy as can be seen in FIG. 5.

Figure 6:
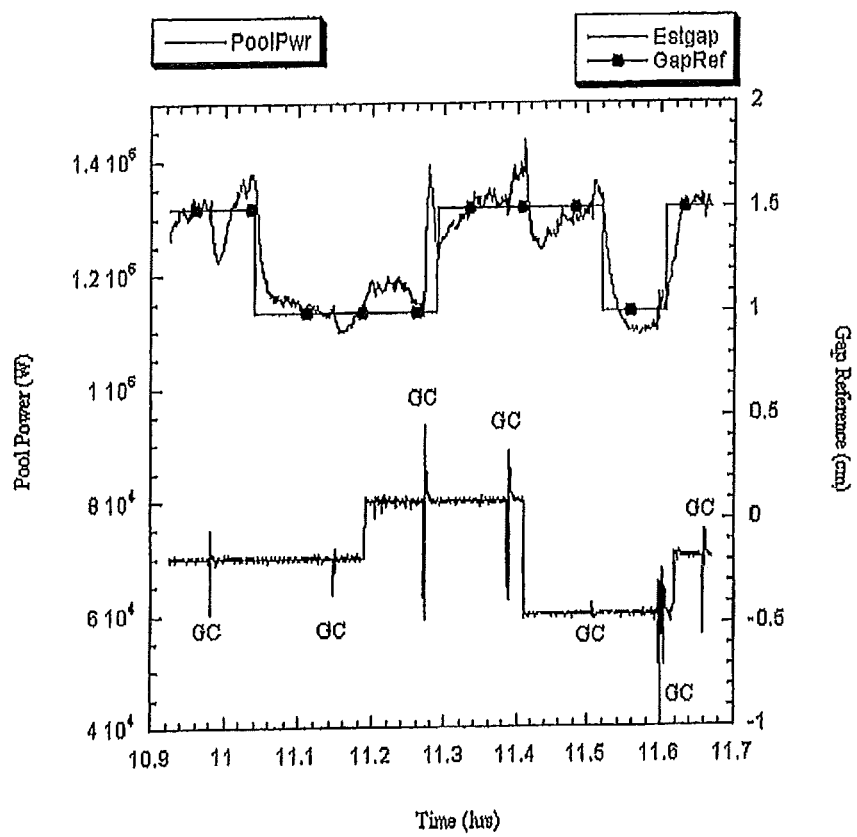
FIG. 6 is a plot of estimated pool power, electrode gap, and gap reference.

FIG. 6 shows plots of estimated pool power, gap, and gap reference. The figure shows that the estimator "believes" it is controlling the melt correctly. It is also seen that the gap checks constitute relatively severe perturbations to the estimated electrode gap. This coupled with the frequent changes in electrode gap reference probably accounts for much of the scatter in the plot shown in FIG. 5.

The controller of the invention can be tested for internal consistency by determining if the estimated pool powers used for the factor space all give a value of 0.3 for ε. ε can be calculated from the estimated pool power using the following equation:

$$\hat{\varepsilon} = \frac{\hat{P}_{pool} - \frac{\hat{M} h_{sup}}{\rho}}{V_{CF} + (R_I + R_G G_{meas}) I_{meas}}. \tag{6}$$

Figure 7:
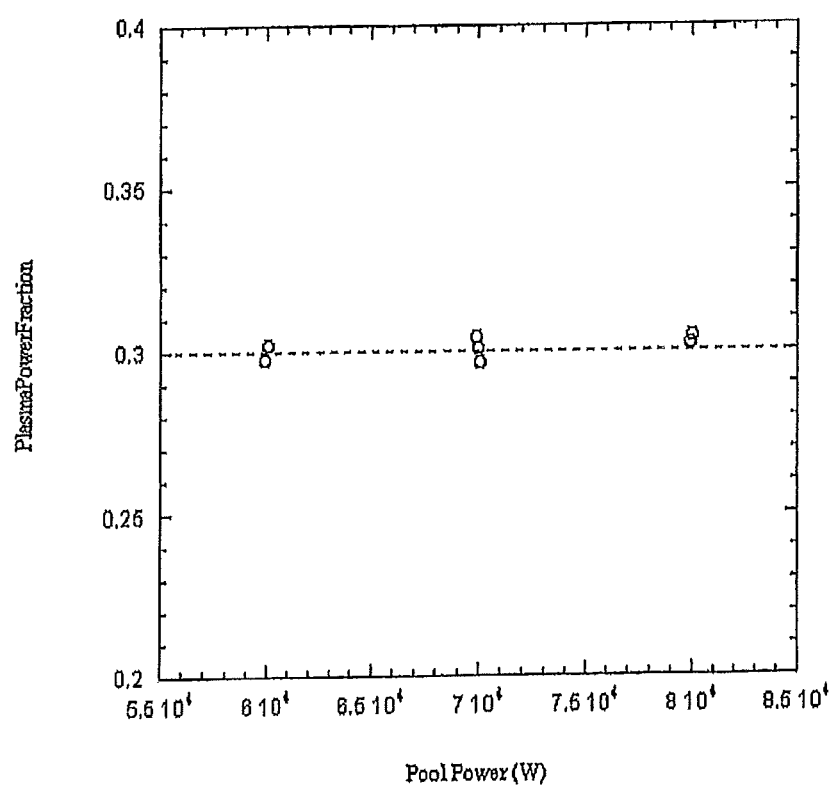
FIG. 7 is plot of the estimated pool power fraction for the three powers used in the factor space experiment.

The estimated power fraction obtained from Equation (6) and the estimated pool power data are plotted in FIG. 7. It is evident from this figure that the controller is functioning correctly though there is no direct evidence that the pool power estimates are correct in an absolute sense.

Figure 8:
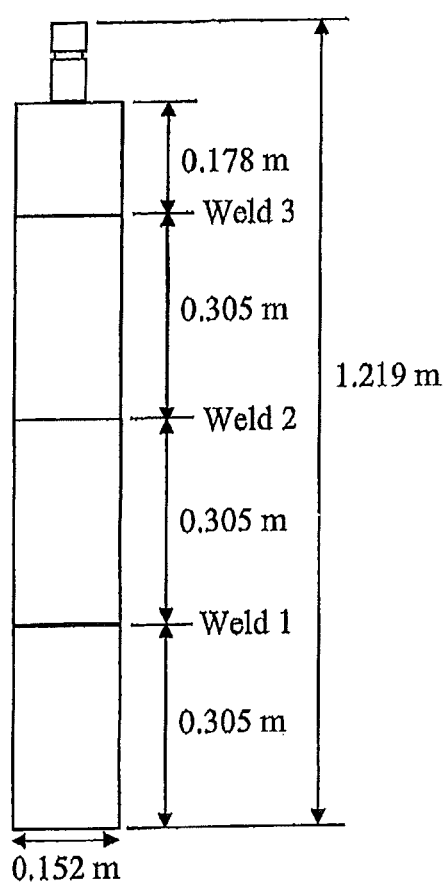
FIG. 8 is a depiction of the Test 3 electrode of the example showing the locations of the three welds—the electrode segments were gas tungsten arc (TIG) welded around the electrode circumference.

Test 3:

A 158.5 kg electrode was melted using a full 9-state controller. The electrode consisted of four pieces butt-welded together as depicted in FIG. 8. Each weld extended around the electrode circumference and was performed without filler metal.

Figure 9:
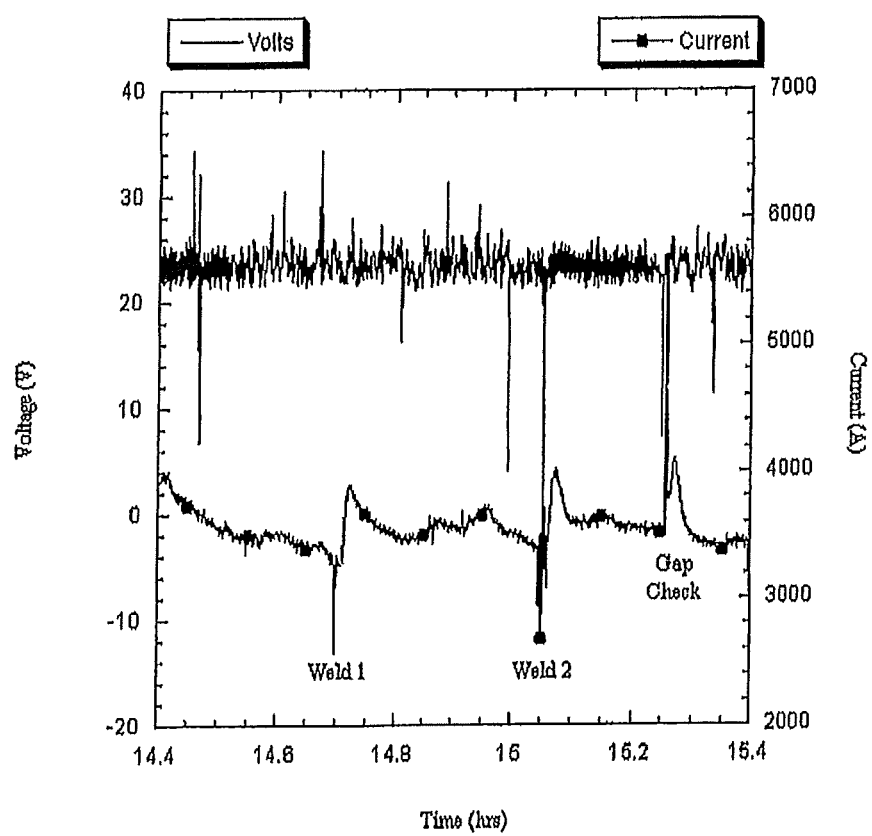
FIG. 9 is a plot showing voltage and current histories for Test 3.

FIG. 9 shows plots of the voltage and current histories for Test 3. The positions of the welds are marked in the figure with the exception of Weld 3, which occurred at the very end of melting. That is, the melt was shut off as soon as the weld was encountered. A gap check is also marked in the figure.

Figure 10:
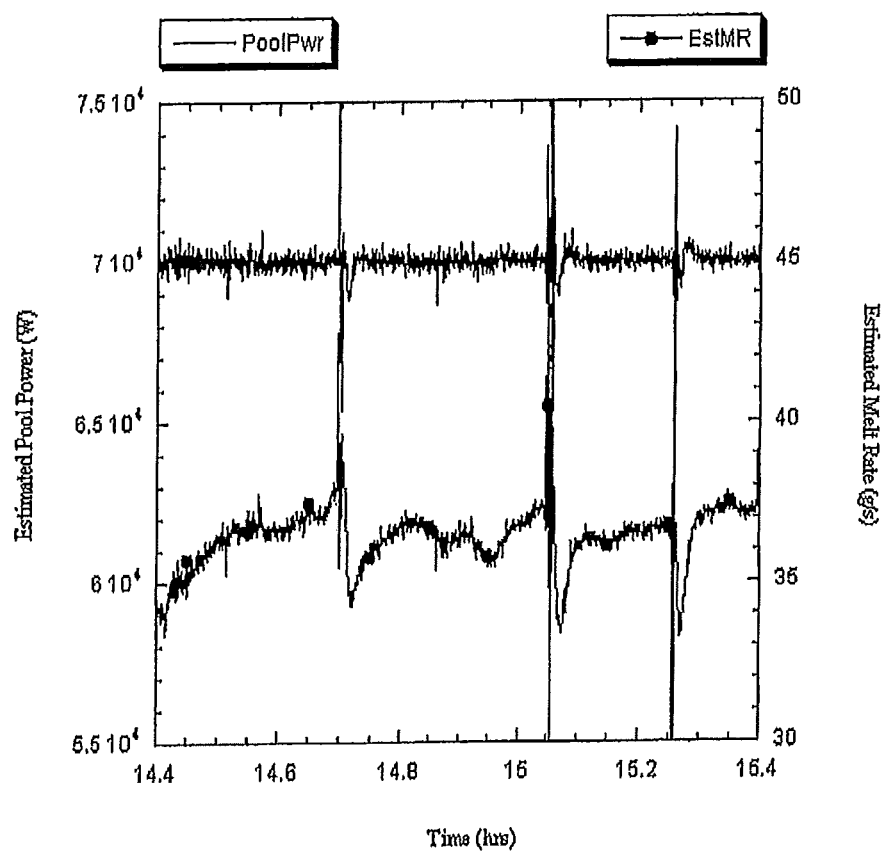
FIG. 10 is a plot showing estimated pool power and melt rate for Test 3.

FIG. 10 shows plots of estimated pool power and melt rate. Note the relatively flat power profile and the fluctuations in melt rate in response to the welds. It is seen that the controller is controlling pool power while letting the melt rate float open loop. Also, returning to FIG. 9, it is clear that the melt rate fluctuations correlate well to the fluctuations in melting current. It is clear from these data that both melt power and arc power are undergoing significant fluctuations, but that their sum, namely pool power, is being held constant (FIG. 10, upper trace) except during the severe process disturbances associated with melting through the welds in the electrode. This constitutes proof that the pool power control apparatus of the present invention executes a new method of control that differs significantly from either melt rate control (Bertram et al.) or plain arc power control.

Figure 11:
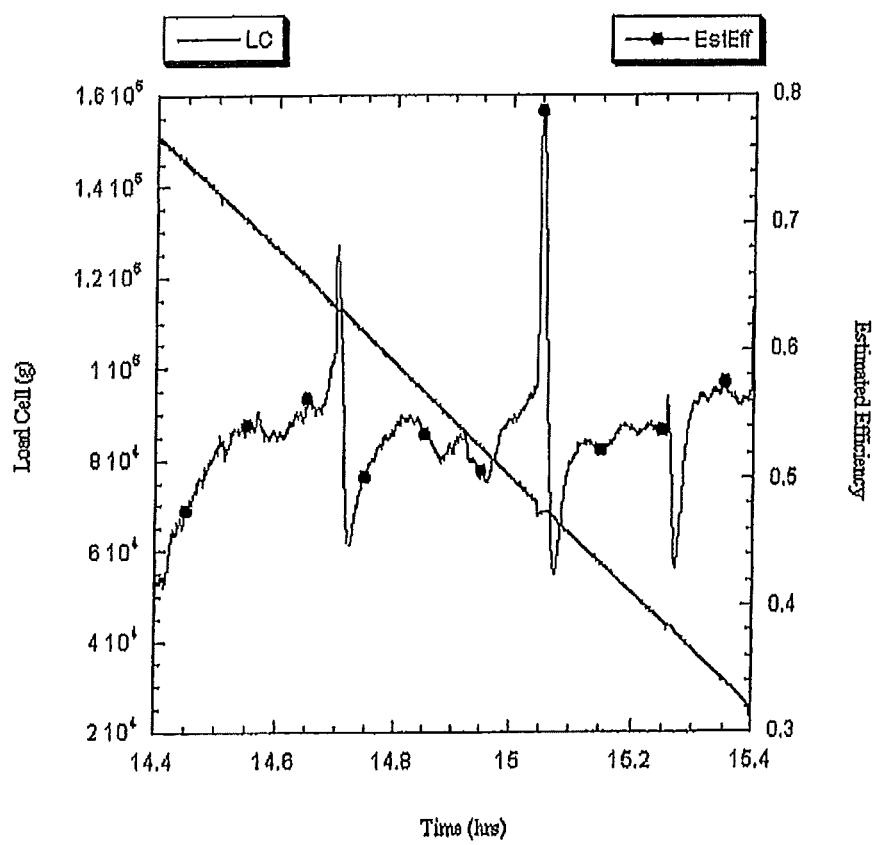
FIG. 11 is a plot showing load cell data and estimated efficiency for Test 3.

FIG. 11 shows load cell and estimated efficiency data for this test. Note the efficiency spikes associated with the "flat" spots in the load cell history. These regions correspond to pieces of electrode falling into the pool as the melt zone encounters the welds. Analysis shows that 0.710 kg of material fell in during the first, 2.410 kg during the second, and 2.160 kg during the third weld event. The sudden loss in weight causes the efficiency to spike: the controller "thinks" that this material has melted instantaneously. It responds by dropping the current (FIG. 9). However, the controller soon recovers and raises the current once it detects that the melt rate has actually slowed due to the melt zone encountering the "cold" material above the weld.

The ingot was sliced lengthwise, polished, and macro-etched. The melt pool profile was visible in the two places where electrode sections fell in when the welds were melted through. The columnar grain structure was maintained through the regions marking the weld effects. Thus, it appears that the electrode fall-in material melted after initially chilling the melt pool. Also visible was the porosity and rough ingot top due to the fact that the melt was terminated at full power when the third weld was melted though.

The tests described above demonstrate the preferred embodiment of the pool power control apparatus under the assumptions used to derive Equation (3). The controller held estimated pool power at its reference setpoint by manipulating melt rate. Gap control during the factor space experiment was characterized by a significant amount of noise, much of which was probably due to the frequent gap checks and setpoint changes.

The preceding example can be repeated with similar success by substituting the generically or specifically described reactants and/or operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for controlling pool power, pool power being defined as the total energy flux into a top ingot surface during vacuum arc remelting processes, the apparatus comprising:
   a. a remelting furnace comprising a movable electrode, an electrode drive and a programmable logic controller, the programmable logic controller being a digital hardware device that sends current and drive speed commands to the furnace;
   b. an electrical current supply that supplies current to the electrode;
   c. an ingot pool located beneath the electrode, the ingot pool comprising molten metal from the electrode;
   d. a pool power control computer that communicates with the programmable logic controller using a communication protocol comprising an ethernet connection, and which sends two separate and distinct controller signals over the connection from a first controller and a second controller programmed into the computer;
   e. the first controller that adjusts the current supplied to the remelting furnace based upon a predetermined pool power reference value by sending new current commands to the programmable logic controller, the pool power reference value being defined as the sum of a total melt power entering the ingot pool as enthalpy contained in molten metal dripping from the melting electrode plus a fraction, ε, of an electrical arc power, the fraction comprising the arc power collected by the ingot pool surface, wherein the first controller employs the following equation to calculate the adjusted current:

$$f_I = \frac{-(V_{CF} + \langle \hat{V}_b \rangle)}{2(R_I + R_G \langle \hat{G} \rangle)} + \sqrt{\left(\frac{(V_{CF} + \langle \hat{V}_b \rangle)}{2(R_I + R_G \langle \hat{G} \rangle)}\right)^2 + \frac{\langle P_{pool,ref} \rangle + \frac{\alpha_r C_{S\Delta} A_e h_{sup}}{\langle \hat{\Delta} \rangle}}{\left(\frac{\langle \hat{\mu} \rangle C_{Sp} h_{sup}}{h_m} + \varepsilon\right)(R_I + R_G \langle \hat{G} \rangle)}},$$

wherein $P_{pool}$ is a pool power reference setpoint, $h_{sup}$ is a volume specific enthalpy at superheat temperature, ε is an arc power fraction to the pool surface, $V_{CF}$ is a cathode fall voltage, $R_I$ is a VAR circuit resistance less an electrode gap resistance, $R_G$ is an experimentally determined electrode gap resistance parameter, G is an electrode gap, $A_e$ is an electrode cross-sectional area, $a_r$ is a room temperature thermal diffusivity, $C_{S\Delta}$ and $C_{Sp}$ are material dependent constants, $\mu$ is a process efficiency, $\Delta$ is an electrode thermal boundary layer, and $h_m$ is a volume specific enthalpy at melt temperature, $V_b$ is a voltage bias, a circumflex over a variable indicates that it is an estimated value supplied by a nonlinear remelting estimator, and the angular brackets indicate variables supplied to the equation as opposed to constants, and f. the second controller that adjusts the remelting furnace's electrode drive speed based upon a predetermined electrode gap reference value, $G_{ref}$, and a predetermined pool power reference value, $P_{pool,ref}$, by sending electrode drive speed commands to the programmable logic controller, wherein the adjusted electrode drive speed is calculated from the following equation:

$$f_G = \frac{a}{h_{sup}A_e}\{\langle P_{pool,ref}\rangle - \varepsilon[(V_{CF} + \langle \hat{V}_b\rangle)I_C + (R_I + R_G\langle \hat{G}\rangle)I^2]\}$$

wherein a is a fill ratio parameter, $h_{sup}$ is a volume specific enthalpy at superheat temperature, $\varepsilon$ is an arc power fraction to the pool surface, $V_{CF}$ is a cathode fall voltage, $V_b$ is a bias voltage, $R_I$ is a VAR circuit resistance less an electrode gap resistance, $R_G$ is an experimentally determined electrode gap resistance parameter, G is an electrode gap, $A_e$ is an electrode cross-sectional area, I is a process current, a circumflex over a variable indicates that it is an estimated value supplied by a nonlinear remelting estimator, and the angular brackets indicate variables supplied to the equation as opposed to constants.

2. The apparatus of claim 1 additionally comprising a non-linear remelting estimator that receives adjusted current and adjusted electrode drive speed as well as measurements from the remelting furnace as inputs.

3. The apparatus of claim 1 additionally comprising a non-linear remelting estimator that receives adjusted current and adjusted electrode drive speed as inputs, wherein the first and second controllers adjust current and drive speed based upon output from the non-linear remelting estimator.

4. The apparatus of claim 1 wherein a nonlinear remelting estimator outputs an estimated current bias to adjust current supplied to the electrode.

5. The apparatus of claim 1 wherein a nonlinear remelting estimator outputs an estimated electrode drive speed bias to adjust the electrode drive speed.

* * * * *